(12) United States Patent
Mishra et al.

(10) Patent No.: US 9,880,965 B2
(45) Date of Patent: Jan. 30, 2018

(54) VARIABLE FRAME LENGTH VIRTUAL GPIO WITH A MODIFIED UART INTERFACE

(71) Applicant: QUALCOMM Incorporated, San Diego, CA (US)

(72) Inventors: Lalan Jee Mishra, San Diego, CA (US); Richard Dominic Wietfeldt, San Diego, CA (US); James Lionel Panian, San Marcos, CA (US); Radu Pitigoi-Aron, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 14/850,809

(22) Filed: Sep. 10, 2015

(65) Prior Publication Data

US 2016/0077995 A1 Mar. 17, 2016

Related U.S. Application Data

(60) Provisional application No. 62/049,346, filed on Sep. 11, 2014.

(51) Int. Cl.
| | |
|---|---|
| *G06F 13/00* | (2006.01) |
| *G06F 13/14* | (2006.01) |
| *G06F 13/20* | (2006.01) |
| *G06F 13/42* | (2006.01) |
| *G06F 1/10* | (2006.01) |
| *G06F 13/38* | (2006.01) |

(52) U.S. Cl.
CPC ............ *G06F 13/4221* (2013.01); *G06F 1/10* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 6,990,549 | B2 | 1/2006 | Main et al. |
| 7,046,065 | B2 | 5/2006 | Ruat et al. |
| 8,838,856 | B2 | 9/2014 | Partani et al. |
| 2009/0037621 | A1 | 2/2009 | Boomer et al. |
| 2011/0296060 | A1* | 12/2011 | Mychalowych .... G06F 13/4045 710/15 |
| 2012/0297233 | A1* | 11/2012 | Ross ................ H04N 21/23602 713/502 |

(Continued)

OTHER PUBLICATIONS

International Search Report and Written Opinion—PCT/US2015/049815—ISA/EPO—dated Jan. 4, 2016.

(Continued)

*Primary Examiner* — David E Martinez
(74) *Attorney, Agent, or Firm* — Haynes & Boone LLP

(57) ABSTRACT

A virtual GPIO interface is provided that receives a transmit set of GPIO signals from a processor. The virtual GPIO interface transmits a portion of the transmit set of GPIO signals over GPIO pins in a conventional fashion. However, the virtual GPIO interface provides a remaining portion of the transmit set of GPIO signals to a finite state machine that serializes the GPIO signals in the remaining portion into frames of virtual GPIO signals. A modified UART interface transmits the frames over a UART transmit pin responsive to cycles of a UART oversampling clock.

15 Claims, 11 Drawing Sheets

(56) References Cited

U.S. PATENT DOCUMENTS

2014/0108679 A1 4/2014 Mishra et al.
2015/0149672 A1 5/2015 Mishra et al.

OTHER PUBLICATIONS

MPC5644A Microcontroller Product Brief, MPC5644APB, Freescale Semiconductor Product Brief, MPC5644APB, Rev. 5, Sep. 2010, 32 pages.

* cited by examiner

VARIABLE FRAME LENGTH VIRTUAL GPIO WITH A MODIFIED UART INTERFACE

CROSS-REFERENCE TO RELATED APPLICATIONS

This application claims the benefit of U.S. Provisional Application No. 62/049,346, filed Sep. 11, 2014, the contents of which are hereby incorporated by reference in their entirety.

TECHNICAL FIELD

This application relates to general purpose input/output (GPIO), and more particularly to an integrated circuit configured to use a pair of pins as virtual GPIO pins.

BACKGROUND

General purpose input/output (GPIO) enables an integrated circuit designer to provide generic pins that may be customized for particular applications. For example, a GPIO pin is programmable to be either an output or an input pin depending upon a user's needs. A GPIO host or peripheral will typically control groups of pins which can vary based on the interface requirement. Because of the programmability of GPIO pins, they are often included in microprocessor and microcontroller applications. For example, an applications processor in a mobile device may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIOs (one GPIO to transmit a given signal and one GPIO to receive that signal). For example, a symmetric IPC interface between a modem processor and an application processor may comprise five signals, which translates to 10 GPIO pins being necessary for the resulting IPC signaling. The need for so many GPIO pins for IPC communication increases manufacturing cost. Moreover, devoting too many GPIOs for IPC limits the GPIO availability for other system-level peripheral interfaces. The problem cannot be solved by moving the IPC communication onto the main data bus between the processors in that certain corner conditions are then violated.

Accordingly, there is a need in the art for a GPIO architecture that can accommodate numerous input/output signals without requiring an excessive number of pins.

SUMMARY

A hybrid virtual GPIO architecture is provided for communication between two integrated circuits each having a processor. This architecture is deemed as "hybrid" in that it accommodates both GPIO signals and messaging signals. As discussed earlier, a GPIO signal in a conventional GPIO system is dedicated to a particular pin. The receipt of the GPIO signal on the corresponding GPIO pin identifies the signal to the receiving processor. But a messaging signal is received on a dedicated receive pin such as in a serial peripheral interface (SPI) or an inter process communication (IPC) interface. Assorted messaging signals may thus be received on the same dedicated receive pin. To distinguish between messaging signals, it is conventional that the messaging signals include an address header containing an address. The receiving integrated circuit routes the received messaging signal to an appropriate register based upon the address. For example, one type of messaging signal may relate to the identity of an installed card such as a wireless card or a GPS card. Such a messaging signal would then have an address that maps to an appropriate register so that corresponding message content may be registered accordingly. By interpreting the resulting contents of the register, the receiving processor can then interpret the identity of the installed cards. Other types of messaging signals would be routed to the appropriate registers in the receiving integrated circuit in an analogous fashion.

Each integrated circuit also includes a virtual GPIO interface for communicating with the other integrated circuits using a transmit set of GPIO signals. The virtual GPIO interface is configured to transmit a portion of the transmit set over GPIO pins to a remote processor in a conventional fashion. But the remaining portion of the transmit set are not transmitted on individual GPIO pins. Instead, the remaining portion of the transmit set GPIO signals are serialized by a hybrid virtual GPIO finite state machine (FSM) into at least one frame and transmitted over a dedicated transmit pin. The hybrid virtual GPIO finite state machine is also configured to serialize the messaging signals into the at least one frame or into dedicated frame(s) for the messaging signals.

To obviate the need for an external clock to synchronize the transmission and reception of the virtual GPIO signals and the messaging signals, each integrated circuit also includes a modified Universal Asynchronous Receiver/Transmitter (UART) interface. Each integrated circuit's hybrid virtual FSM is configured to provide the frames of virtual GPIO signals and/or the frames of messaging signals to the corresponding modified UART interface. Each modified UART interface is configured to transmit each bit in the frames over a UART transmit pin by oversampling the bit using an oversampling clock and transmitting the resulting samples over the transmit pin to a receive pin for a modified UART interface in a remote integrated circuit. The receiving modified UART interface samples each received bit using its oversampling clock and decodes the bits based upon the resulting samples as known in the UART arts. The resulting architecture is quite advantageous as no external clock pins are necessary to synchronize the resulting transmission of virtual GPIO signals and messaging signals using just a single transmit pin and a single receive pin.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
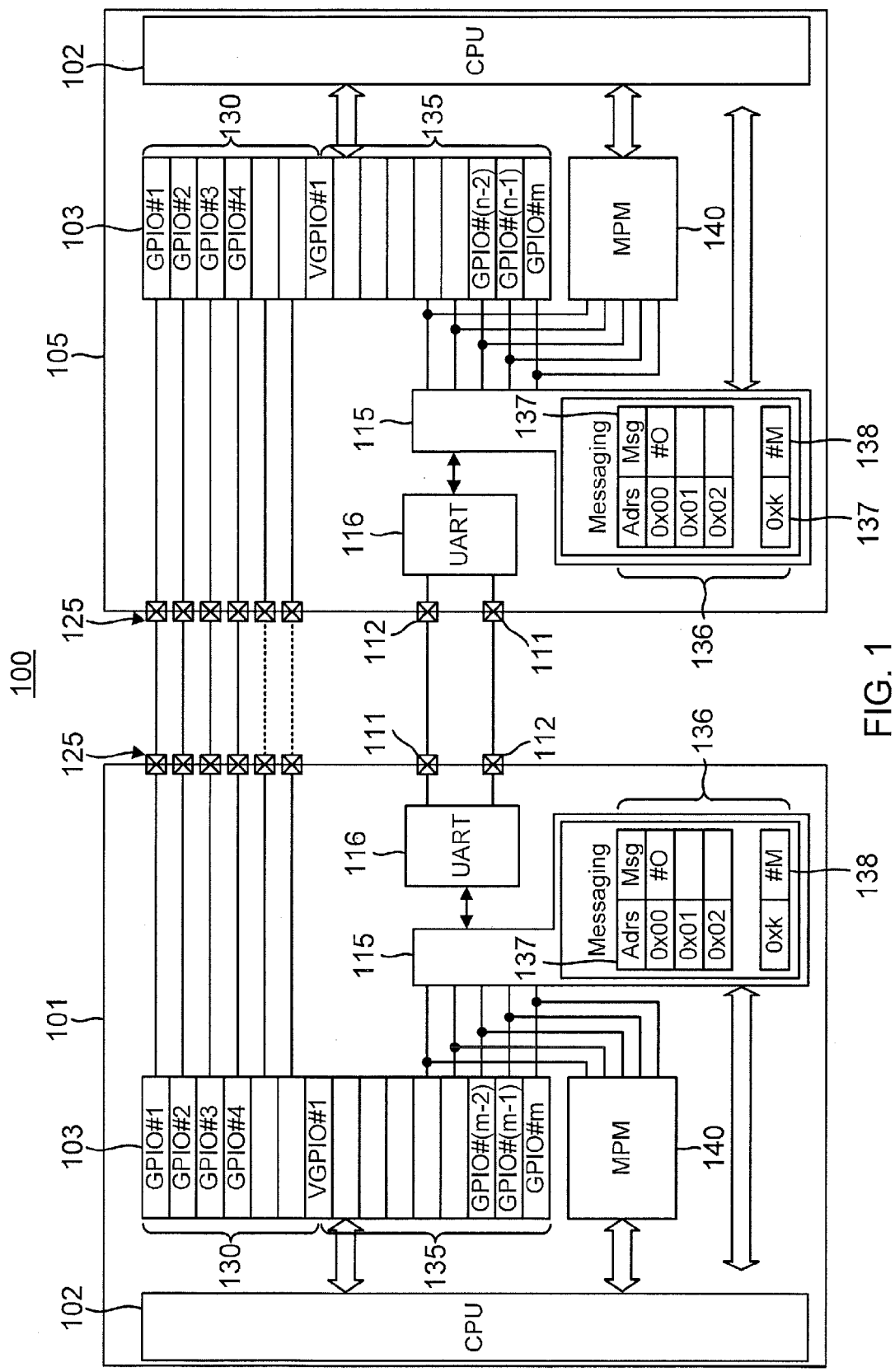
FIG. 1 is block diagram of an example hybrid virtual GPIO system in which each integrated circuit includes a modified UART interface.

A hybrid virtual general purpose input/output (GPIO) architecture or system is provided that enables an integrated circuit to use a pair of UART transmit (TX) and receive (RX) pins as if they constituted a larger plurality of GPIO pins. This architecture is deemed as virtual in that, to the system-level applications creating GPIO signals, it is as if those GPIO signals were being accommodated for input/output on conventional GPIO pins despite the GPIO signals being serialized and transmitted as virtual GPIO signals. In other words, a system-on-a-chip (SoC) or other integrated circuit having the virtual GPIO architecture disclosed herein experiences no functional difference between GPIO signals and virtual GPIO signals. However, only two pins are used to transmit and receive the virtual GPIO signals that would otherwise each need their own dedicated pair of GPIO pins (if the GPIO signal is symmetric).

The system is deemed as "hybrid" in that it accommodates both virtual GPIO signals and messaging signals. As discussed earlier, a GPIO signal in a conventional GPIO system is dedicated to a particular pin. The receipt of the GPIO signal on the corresponding GPIO pin identifies the signal to the receiving processor. In the disclosed hybrid virtual GPIO architecture, each integrated circuit includes a processor that couples to a virtual GPIO interface. The processor provides a transmit set of GPIO signals to the virtual GPIO interface. The virtual GPIO interface drives a first portion of the transmit set of GPIO signals over corresponding GPIO pins in a conventional fashion. The virtual GPIO interface provides a remaining second portion of the transmit set of GPIO signals to a hybrid virtual GPIO finite state machine (FSM). The hybrid virtual GPIO FSM is configured to serialize the remaining second portion of the transmit set of GPIO signals into a transmit set of virtual GPIO signals organized into one or more frames. A modified virtual UART interface is configured to transmit the frames over a dedicated transmit pin. The position within a frame links a given virtual GPIO signal to the corresponding GPIO signal from which it was transformed.

Each modified UART interface includes a dedicated receive pin that couples to the transmit pin of a modified UART interface in a transmitting integrated circuit in the system. The receiving modified UART interface receives the transmit set of virtual GPIO signals over the dedicated receive pin to form a receive set of virtual GPIO signals that are then provided to the receiving integrated circuit's hybrid virtual GPIO FSM in one or more frames. The hybrid virtual GPIO FSM in the receiving integrated circuit may then use the frame position for a given virtual GPIO signal in the receive set of virtual GPIO signals to transform the given virtual GPIO signal into a GPIO signal that is then presented to the receiving integrated circuit's virtual GPIO interface so that it may be provided to the corresponding processor. This is quite advantageous in that neither the processor in the transmitting integrated circuit nor the processor in the receiving integrated circuit requires any software or hardware modifications: the virtualization of the GPIO signals is transparent to the processors as it is carried out in the hybrid virtual GPIO FSMs and the virtual GPIO interfaces.

In contrast to the GPIO signals, a messaging signal is conventionally received on a dedicated receive pin such as in a serial peripheral interface (SPI) or an inter process communication (IPC) interface. Assorted messaging signals may thus be received on the same dedicated receive pin. To distinguish between messaging signals, it is conventional that the messaging signals include an address header containing an address. The receiving integrated circuit routes the received messaging signal to an appropriate register based upon the address. For example, one type of messaging signal may relate to the identity of an installed card such as a wireless card or a GPS card. Such a messaging signal would then have an address that maps to an appropriate register so that corresponding message content may be registered accordingly. By interpreting the resulting contents of the register, the receiving processor can then interpret the identity of the installed cards. Other types of messaging signals would be routed to the appropriate registers in the receiving integrated circuit in an analogous fashion.

To accommodate the transmission of the messaging signals, each hybrid virtual GPIO FSM is configured to include a set of messaging registers for the corresponding processor. Each processor may write a transmit set of messaging signals to the messaging registers. Analogous to the identification of the virtual GPIO signals, the messaging signals are also identified by their position in a frame. The receiving hybrid virtual GPIO finite state machine is configured to use the frame position of the received messaging signals so as to write them to the corresponding messaging registers. The processor in the receiving integrated circuit then retrieves the received messaging signals from the messaging registers in a conventional fashion. As was the case for the virtual GPIO signals, it is thus transparent to each processor that the messaging signals are transmitted and received through a hybrid virtual GPIO finite state machine.

An external clock may be used to synchronize the transmission and reception of the virtual GPIO signals and messaging signals from one hybrid virtual GPIO finite state machine to another. But the use of an external clock comes at the cost of a clock pin. To eliminate the need for a clock pin, each hybrid virtual GPIO finite state machine couples to its transmit pin through a modified UART interface. Each modified UART interface differs from a conventional UART interface in that Request To Send (RTS) pins and Clear To Send (CTS) pins are unnecessary. In contrast to conventional UART signals, GPIO signals do not require flow control as they are relatively low bandwidth signals. Unless the receiving integrated circuit's processor is inoperable, it may thus be assumed that the receiving integrated circuit is always ready to receive the receive set of virtual GPIO signals during normal operation. The modified UART interfaces disclosed herein thus do not need conventional UART flow control such as implemented through RTS and CTS pins. Each modified UART interface exploits, however, the UART oversampling clock as used in conventional UART interfaces. The oversampling clock rate is sufficiently faster than the bit rate for the virtual GPIO signals and messaging signals so that these signals are oversampled. For example, the oversampling clock rate may be 16 times the bit rate. However, it will be appreciated that faster or slower oversampling clock rates may be used in alternative modified UART interface implementations. The following discussion will thus assume that a 16× oversampling clock rate is used without loss of generality.

The communication from a transmitting modified UART interface to a receiving modified UART interface is relatively straightforward: to send a bit having a binary one value, the transmitting modified UART interface may drive its transmit pin to a power supply voltage VDD for the duration of the bit period as determined by sixteen cycles of its oversampling clock. The receiving modified UART interface counts its bit period using its own oversampling clock. Each received bit is sampled according to the oversampling clock. The receiving modified UART interface includes a receiver configured to make a binary decision for each received bit sample. For example, if a received bit sample is less than VDD/2, the received bit sample may be deemed to be binary zero sample. Conversely, if the received bit sample is greater than VDD/2, the received bit sample may be deemed to be a binary one sample. The receiver may thus determine for each bit period whether it received a majority of binary one samples or a majority of binary zero samples with regard to making a bit decision.

Each integrated circuit in a hybrid virtual GPIO system thus includes a virtual GPIO interface, a hybrid virtual GPIO finite state machine, and a corresponding modified UART interface that couples to a UART transmit pin and a UART receive pin. Each integrated circuit's processor provides a transmit set of GPIO signals to the virtual GPIO interface and a transmit set of messaging signals to messaging signals in the hybrid virtual GPIO FSM. A first portion of the transmit set of GPIO signals may be transmitted from the virtual GPIO interface to a remote processor as GPIO signals over a first set of corresponding GPIO pins. A remaining second portion of the transmit set of GPIO signals from the transmitting integrated circuit's processor is provided to the hybrid virtual GPIO FSM. The hybrid virtual GPIO FSM serializes the remaining second portion of the GPIO signals into a transmit set of virtual GPIO signals and provides the transmit set of virtual GPIO signals to the modified UART interface so that they may be sent out over the UART transmit pin in frames. The hybrid virtual GPIO FSM also serializes the transmit set of messaging signals and provides the serialized set of messaging signals to its modified UART interface. The modified UART interface is configured to transmit the serialized transmit set of messaging signals over the transmit pin in frames.

Reception at a receiving modified UART interface occurs analogously as discussed with regard to transmission. In particular, the transmit set of virtual GPIO signals transmitted by a transmitting modified UART interface are received as a receive set of virtual GPIO signals. The GPIO signals transmitted over conventional GPIO pins are received on corresponding GPIO pins in the receiving integrated circuit. The virtual GPIO interface in the receiving integrated circuit presents the received GPIO signals on the GPIO pins to the corresponding processor in a conventional fashion. The frames of virtual GPIO signals and messaging signals are decoded by the receiving modified UART interface and provided to the hybrid virtual GPIO FSM in the receiving integrated circuit. The receiving hybrid virtual GPIO FSM writes the received messaging signals to the corresponding messaging registers so that they may be retrieved by the processor in the receiving integrated circuit. The receiving hybrid virtual GPIO FSM de-serializes the received virtual GPIO signals into GPIO signals that are presented to the virtual GPIO interface. The virtual GPIO interface may then provide the resulting "de-virtualized" GPIO signals to the corresponding processor in the receiving integrated circuit.

In contrast to the modified UART interface, a conventional UART interface uses another pair of pins as a control protocol. In particular, a UART interface indicates that it is ready to receive data by asserting a Request to Send (RTS) pin that is received at the receiving UART interface on a Clear to Send (CTS) pin. So a conventional UART interface only transmits when it sees its CTS pin asserted. The resulting transmission is in frames of eight bits. Since no flow control is necessary for conventional GPIO signals, a modified UART interface differs from a conventional UART interface in that the CTS and RTS pins are deleted. In addition, a modified UART interface is configured to enable the use of variable-sized frames of virtual GPIO data to be transmitted over the modified UART interface's transmit pin. Such modification is desirable in that a frame may include one bit each from the virtual GPIO signals and/or from the messaging signals. A user may require a relatively large number of GPIO signals to be virtualized or only a relatively small number. Similarly, a user may require a relatively large number of messaging signals or a relatively small number of messaging signals to be transmitted in the frames from a hybrid virtual GPIO interface. A fixed frame size may thus be either too small or too large depending upon a user's needs. To alter the frame size, each hybrid virtual GPIO FSM is configured to generate a programming frame for transmission by the corresponding modified UART interface over the transmit pin. The messaging signals may comprise any type of signal that is ordinarily transmitted over a dedicated bus. For example, a messaging signal may comprise an inter-integrated circuit (I2C) signal used for initial configuration of a processor. Just like the virtual GPIO signals, the messaging signals may be divided into a transmit set and a receive set. The transmitting modified UART interface serially transmits the messaging signal transmit set using the dedicated transmit pin so that the receiving modified UART interface may serially receive the messaging signal receive set using the dedicated receive pin.

There are two main embodiments or implementations for the disclosed hybrid virtual GPIO architecture. In a first implementation, each frame transmitted over the dedicated transmit pin includes a header that identifies whether the frame comprises a transmit set of virtual GPIO signals or a transmit set of messaging signals. Such frames are denoted herein as dedicated frames since they are dedicated to either the virtual GPIO signals or to the messaging signals. In a second implementation, a frame may include both virtual GPIO signals and messaging signals. The frames for the second implementation may thus be designated herein as hybrid frames since they include both virtual GPIO signals and messaging signals. An extended header for each hybrid frame identifies the bit positions of the virtual GPIO signals and the messaging signals. Regardless of the frame type, the receiving hybrid virtual GPIO FSM deserializes the received virtual GPIO signals and provides the resulting deserialized virtual GPIO signals to the virtual GPIO interface so that they may be presented to the receiving processor as if they were conventional GPIO signals. Similarly, the receiving hybrid virtual GPIO FSM deserializes the received messaging signals and writes the resulting deserialized messaging signals to the appropriate messaging registers so that the receiving processor may retrieve them. Each transmitting hybrid virtual GPIO FSM demarcates each frame by a start bit and an end bit. The receiving hybrid virtual GPIO FSM determines whether each received frame includes both the start bit and the end bit to monitor whether the processor in the transmitting integrated circuit has failed. This detection is quite advantageous, particularly during the debugging stage for software implementation as it indicates to the receiving processor the time that a transmitting processor became inoperative.

The hybrid virtual GPIO architecture disclosed herein will be discussed with regard to accommodating IPC between a host processor and a peripheral integrated circuit in a mobile telephone or other communication device. However, it will be appreciated that the virtual GPIO circuits and techniques disclosed herein are widely applicable to system on chip (SoC) or application specific integrated circuits (ASICs) requiring GPIO capabilities. Turning now to the drawings, FIG. 1 illustrates a hybrid virtual GPIO system 100 that includes an application processor integrated circuit (IC) 101 and a modem processor IC 105. Integrated circuits 101 and 105 each includes a virtual GPIO interface 103, a hybrid virtual GPIO FSM 115, and a modified UART interface 116. The modified UART interface 116 in application processor IC 101 is configured to drive a transmit pin 111 that couples over a transmission line such as a circuit board trace to a receive pin 112 for the modified UART interface 116 in modem processor IC 105. Similarly, a transmit pin 111 for the modified UART interface 116 in modem processor IC 105 couples to a receive pin 112 for the modified UART interface 116 in application processor IC 100. As used herein, "pin" is a generic term to cover the structure such as a pad or an actual pin that an integrated circuit uses to couple to leads on circuit board or other suitable transmission lines.

Each hybrid virtual GPIO FSM 115 monitors the GPIO state changes discussed below. At a power-on reset (POR) for the corresponding integrated circuit, each UART interface 116 may be configured to use the same baud rate and same settings for the virtual GPIO frame length and messaging signal frame length. Each UART interface 116 may also be software configured by the corresponding integrated circuit's processor (CPU) 102 as indicated by the CPU link to each UART interface 116.

Each processor 102 is configured to transmit and receive GPIO signals through a corresponding virtual GPIO interface 103. In particular, each processor 102 may present a transmit set of GPIO signals to the corresponding virtual GPIO interface 103 for transmission to the remote processor. Similarly, each processor 102 may receive a receive set of GPIO signals from the corresponding virtual GPIO interface 103 as transmitted from the remote processor. With regard to the transmit set of GPIO signals, a first portion of the GPIO signals may be transmitted and received on conventional GPIO pins 125 as GPIO signals 130. For illustration clarity, only four GPIO signals 130 are labelled in FIG. 1 for each virtual GPIO interface 103, ranging from a GPIO signal #1 to a GPIO signal #4. The actual number of GPIO signals 130 may be greater or smaller than four. A remaining portion of the transmit set of GPIO signals presented from the corresponding processor 102 to each virtual GPIO interface 103 is not transmitted or received through conventional GPIO pins 125. Instead, each virtual GPIO interface 103 provides the remaining portion as a plurality of virtual GPIO signals 135 to the corresponding hybrid virtual GPIO FSM 115 so that they may be serialized and transmitted to the receiving one of the integrated circuits 101 and 105 in one or more frames of virtual GPIO signals. In system 100, the set of virtual GPIO signals 135 ranges from a first virtual GPIO signal (#1) to an mth virtual GPIO signal (#m). The value of the positive integer m may vary depending upon the needs of a given implementation.

In addition, each processor 102 may write a transmit set of messaging signals to a set of messaging registers 136 in the corresponding hybrid virtual GPIO FSM 115. Each messaging register 136 corresponds to a particular address 137 for a corresponding message signal 138. In system 100, each hybrid virtual GPIO FSM 115 is shown having a plurality of (M+1) messaging registers ranging from a zero register 136 to an Mth register 136. The value of the positive integer M may vary depending upon the needs of a given implementation. Each hybrid virtual GPIO FSM 115 presents its transmit set of messaging signals and the transmit set of virtual GPIO signals to the corresponding modified UART interface 116 that is explained further below. Note that virtual GPIO signals 135 do not each have their own dedicated pins as is the case for conventional GPIO signals 130. This is quite advantageous in that hybrid virtual GPIO system 100 achieves a significant reduction of pins for integrated circuits 101 and 105 as compared to a conventional GPIO embodiment in which virtual GPIO signals 135 would each require their own GPIO pin.

Figure 2A:
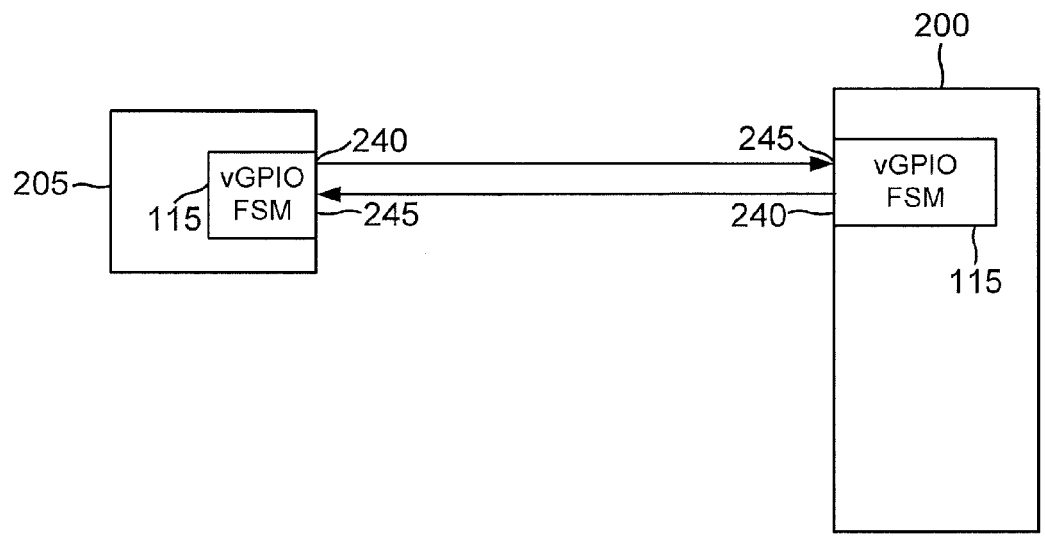
FIG. 2A is a high-level block diagram for a hybrid virtual GPIO system in which a processor communicates with a single remote processor.
Figure 2B:
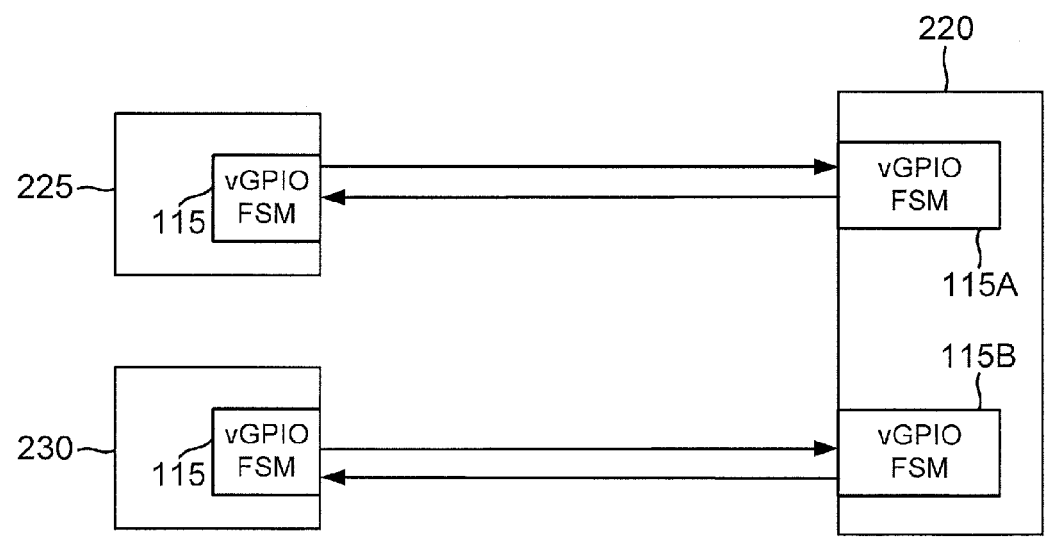
FIG. 2B is a high-level diagram for a hybrid virtual GPIO system in which a processor communicates with two remote processors.

An integrated circuit in a hybrid virtual GPIO system such as system 100 may include just one hybrid virtual GPIO FSM 115 or may include a plurality of these elements for interfacing with multiple external systems. FIG. 2A illustrates a hybrid virtual GPIO system in which an integrated circuit 200 includes a single hybrid virtual GPIO (vGPIO) FSM 115 for communicating with a remote processor in an integrated circuit 205, which includes its own singe hybrid virtual GPIO FSM 115. In contrast, an integrated circuit 220 shown in FIG. 2B incudes a hybrid virtual GPIO FSM 115A and an hybrid virtual GPIO FSM 115B for communicating with remote processors in integrated circuits 225 and 230, respectively. In that regard, an integrated circuit such as a system on a chip (SoC) may be configured with as many hybrid virtual GPIO FSMs 115 as is necessary to accommodate hybrid virtual GPIO signaling with other integrated circuits. Regardless of the number of hybrid virtual GPIO FSMs 115 an integrated circuit may have, each hybrid virtual GPIO FSM 115 communicates using its own dedicated transmit pin 240 and a dedicated receive pin 245 as indicated in FIG. 2A.

Referring again to system 100 of FIG. 1, since virtual GPIO signals 135 and messaging signals 138 are transmitted and received through a finite state machine such as hybrid virtual GPIO FSM 115, processor 102 may be asleep or in another type of dormant state yet still be able to receive virtual GPIO signals 135 and messaging signals 136. In this fashion, hybrid virtual GPIO system 100 not only advantageously economizes the number of pins for each virtual GPIO interface 103 but is also low power. With regard to each processor 102, there is no difference between GPIO signals 130 and virtual GPIO signals 135: they are both treated as GPIO signals that are transmitted and received as necessary through GPIO interface 103.

A processor 102 may need to receive an interrupt signal in response to changes in selected ones of virtual GPIO signals 135. For example, a modem power manager (MPM) 140 may monitor the state of selected virtual GPIO signals 135 such as programmed through interrupt configuration registers (not illustrated). Each virtual GPIO signal 135 may have a corresponding interrupt configuration register. Should a virtual GPIO signal 135 be required to generate an interrupt in response to that signal changing state, the corresponding configuration register would be programmed accordingly. Similarly, should a virtual GPIO signal 135 be one that does not generate an interrupt regardless of whether that signal has changed state, the corresponding interrupt configuration register would also be programmed accordingly. MPM 140 may also comprise a finite state machine. Thus, just like hybrid virtual GPIO FSM 115, MPM 140 is low power and is active regardless of whether its processor 102 is in a sleep mode or some other dormant state.

Virtual GPIO signals 135 may be subdivided into a transmit set and a receive set. Similarly, messaging signals 136 may be subdivided into a transmit set and a receive set. In a symmetric system, each set would have the same number. However, it will be appreciated that hybrid virtual GPIO system 100 is advantageous in that it can readily accommodate an asymmetric signaling embodiment in which the transmit and receive sets of virtual GPIO signals 135 and messaging signals 136 have different sizes. Regardless of whether system 100 is symmetric or asymmetric, each hybrid virtual GPIO FSM 115 receives the transmit set of virtual GPIO signals 135 in parallel from virtual GPIO interface 103 in that each signal in the transmit sets is carried on its own lead (not illustrated) between virtual GPIO interface 103 and the corresponding hybrid virtual GPIO FSM 115. In contrast, the resulting transmission of the transmit sets by hybrid virtual GPIO FSM 115 takes place over a single transmit pin 111.

Figure 3:
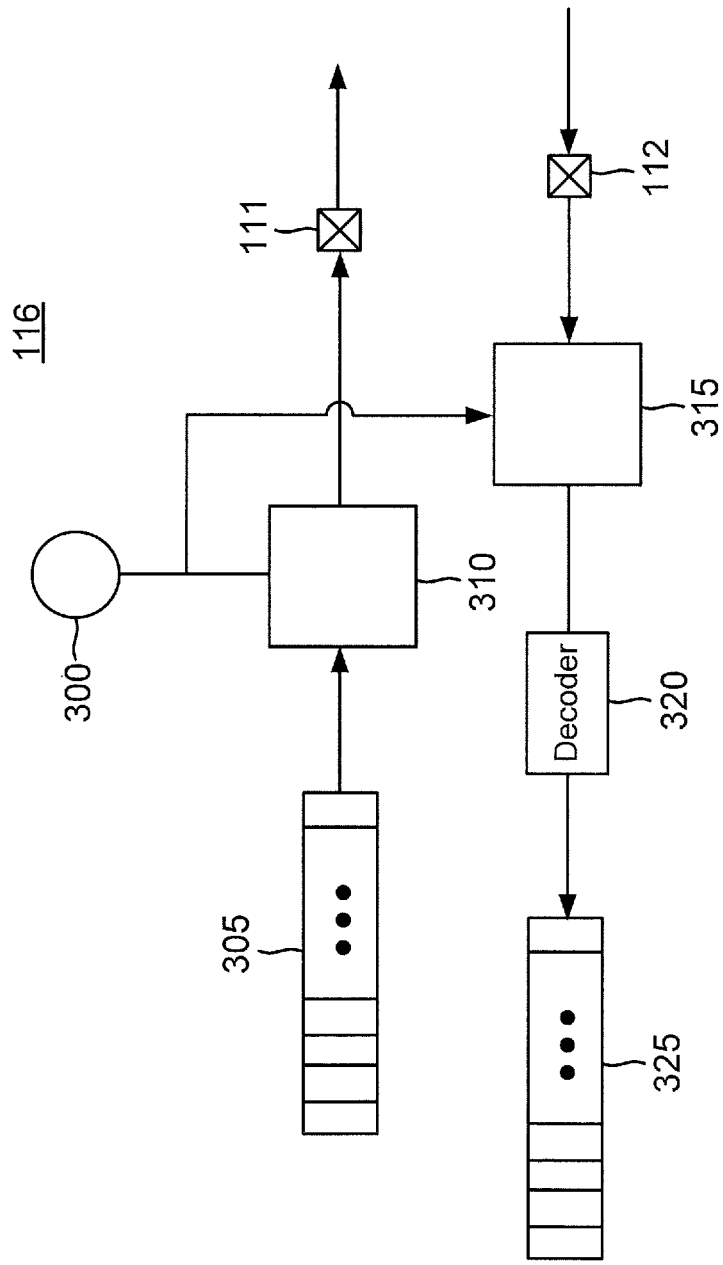
FIG. 3 is a high-level circuit diagram for a modified UART interface in the system of FIG. 1.

A modified UART interface 116 is shown in more detail in FIG. 3. The transmit set of virtual GPIO signals or messaging signals from the corresponding hybrid virtual GPIO FSM (not illustrated) may be received in a shift register 305. Every sixteen cycles of a 16× oversampling clock 300, shift register 305 shifts out a bit to an oversampling transmitter 310. Responsive to cycles of oversampling clock 300 and the binary content of the bit to be transmitted, oversampling transmitter 310 either drives transmit pin 111 to the power supply voltage VDD or to ground. For example, oversampling transmitter 310 may charge the transmit pin to the power supply voltage VDD for sixteen cycles of oversampling clock 300 to transmit a bit having a binary value of one. Conversely, oversampling transmitter 310 may discharge the transmit pin to ground for sixteen cycles of oversampling clock 300 to transmit a bit having a binary value of zero.

Modified UART interface 116 also includes an oversampling receiver 315 that samples a received signal on receive pin 112 responsive to cycles of oversampling clock 300. For example, oversampling receiver 315 may compare each sample of the received signal to a threshold voltage such as VDD/2 to determine whether the received signal is a binary zero or a binary one. If the sample is greater than VDD/2, oversampling receiver 315 may deem the sample as being a sample of a binary one bit. Conversely, if the sample is less than VDD/2, oversampling receiver 315 may deem the sample as being a sample of a binary zero bit. A decoder 320 decodes the resulting samples from oversampling receiver 315 by determining whether the majority of samples over sixteen cycles of oversampling clock 300 are binary one samples or binary zero samples. If the majority of the samples are binary one samples, decoder 320 deems the received bit to be a binary one bit. Conversely, if the majority of the samples are binary zero samples, decoder 320 deems the received bit to be a binary zero bit. The resulting bits are shifted into a receive shift register 325 every sixteen cycles of oversampling clock 300. Note that no RTS or CTS control is necessary as discussed previously due to the relatively low bandwidth of the corresponding virtual GPIO signals 135 and messaging signals 138. In one embodiment, modified UART interface 116 may be deemed to comprise a means for transmitting at least one first frame over a single transmit pin to a remote second processor responsive to cycles of an oversampling clock.

Figure 4:
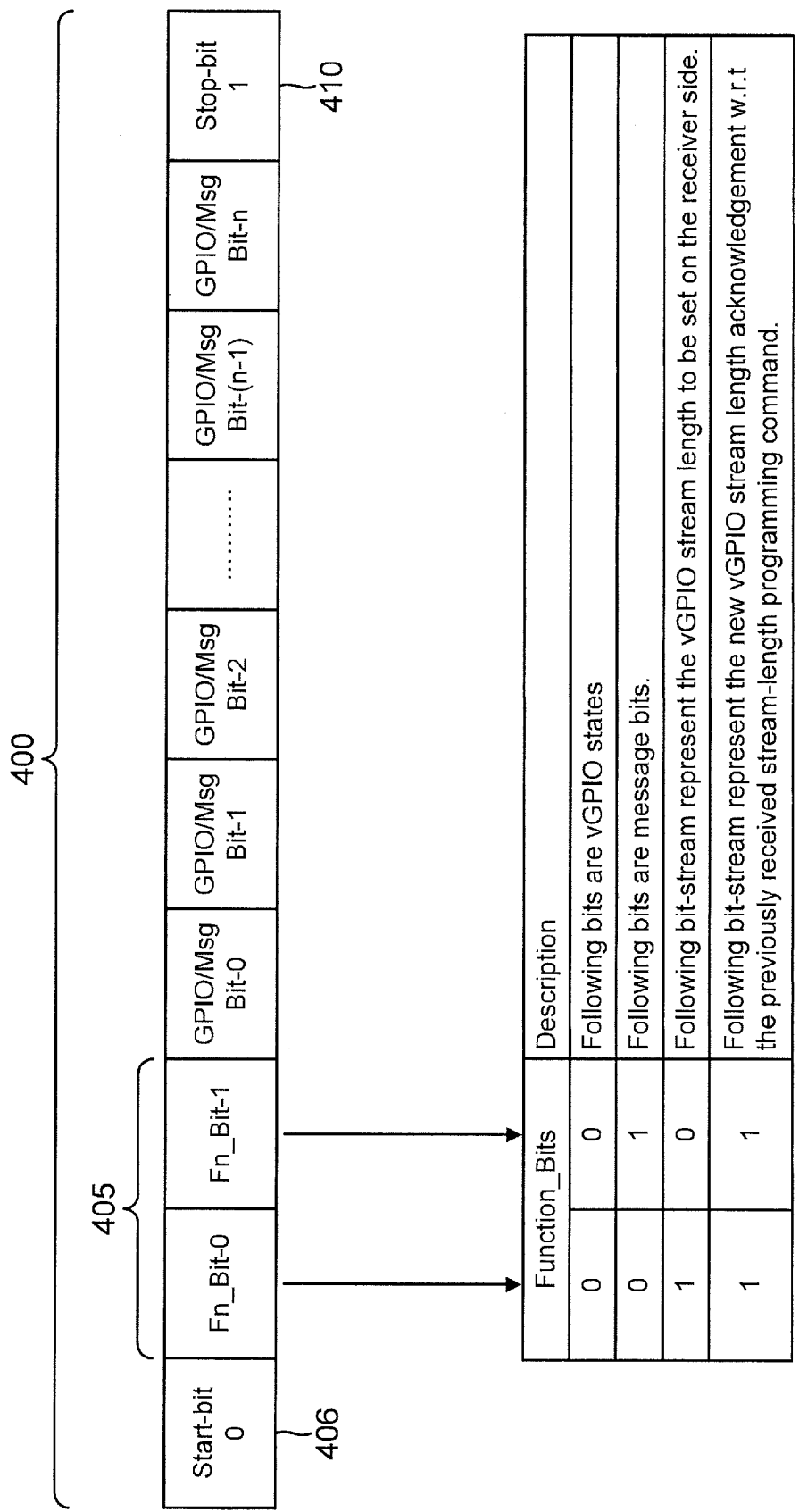
FIG. 4 illustrates the format for a virtual GPIO/messaging signal frame for the system of FIG. 1.

The frame length control by each hybrid virtual GPIO FSM 115 will now be discussed. The frame length is important in that each virtual GPIO signal 135 and messaging signal 138 may be identified by its position with a transmitted or received frame. Both the transmitting and receiving hybrid virtual GPIO FSM 115 must thus use the same frame length size so that the identity of the received virtual GPIO signals 135 and messaging signals 138 may be ascertained. In one implementation, the frame size for frames is determined by a header to be a certain number of bits long. An example dedicated frame 400 is shown in FIG. 4. A header 405 may comprise two function bits, fn_0 and fn_1. In one embodiment, if both function bits are zero, the following bits are vGPIO signals 135 (dedicated frame 400 being dedicated to virtual GPIO signals 135). If fn_0 is zero and fn_1 equals 1, then the following bits may be messaging signals 138 (dedicated frame 400 being dedicated to messaging signals 138). If fn_0 is one and fn_1 equals 0, then the following bits may program or change the length of dedicated frame 400. Similarly, if both function bits are one, the following bits in dedicated frame 400 represent an acknowledgement by the remote processor of the desired frame length as previously changed. If the transmit set of virtual GPIO signals (or the transmit set of messaging signals) is less than this fixed frame size, the unused bits within each dedicated frame 400 may be don't care values. Alternatively, each hybrid virtual GPIO FSM 115 may be configured to alter the size of the transmitted frames depending upon the number of bits needed for a given application.

To detect the receipt of a complete dedicated frame 400, each modified UART interface 116 may include a logic circuit (not illustrated) that counts the number of UART oversampling clock cycles after a receipt of a start bit 406 for dedicated frame 400. For example, suppose the frame length for dedicated frame 400 is ten bits. The logic circuit would then count 160 cycles of oversampling clock 300 after receipt of start bit 406. After waiting another 160 cycles of the oversampling clock, modified UART interface 116 would then expect receipt of an end or stop bit 410. Should stop bit 410 be detected accordingly, modified UART interface 116 may then strobe the corresponding hybrid virtual GPIO FSM 115 with a complete frame of virtual GPIO signals 135 or messaging signals 138. The latched received set of virtual GPIO signals 135 may then be presented to virtual GPIO interface 103 as discussed previously.

This framing of each dedicated frame 400 by start bit 406 and stop bit 410 is advantageous in that each processor 102 can then monitor the health of the remote processor without needing any additional dedicated pins. For example, each modified UART interface 116 may be configured to weakly pull its transmit pin 111 to the power supply voltage VDD during a default state (no change in the current state versus the previous state for the transmit set of virtual GPIO signals 135). Start bit 406 would be a logical zero for such an embodiment such that modified UART interface 116 may ground its transmit pin 111 for the duration of start bit 406. In this fashion, each receiving modified UART interface 116 may readily detect receipt of a start bit 406 by detecting that its receive pin 112 has been discharged. There is the possibility that a processor 102 has failed such that it inappropriately pulls its transmit pin 111 to ground. The modified UART interface 116 in the receiving integrated circuit would thus detect this as a start bit and begin counting toward the end of dedicated frame 400 accordingly. But stop bit 410 is a logical one in this embodiment such that each modified UART interface 116 charges its transmit pin 111 to the power supply voltage VDD for the duration of stop bit 410 to signal the end of a frame transmission. If a processor 102 has failed such that the receiving hybrid virtual GPIO FSM 115 has detected what is deemed to be a start bit 406, stop bit 410 will not be detected so that the receiving hybrid virtual GPIO FSM 115 may notify its processor 102 of the failure of the remote processor accordingly.

Figure 5:
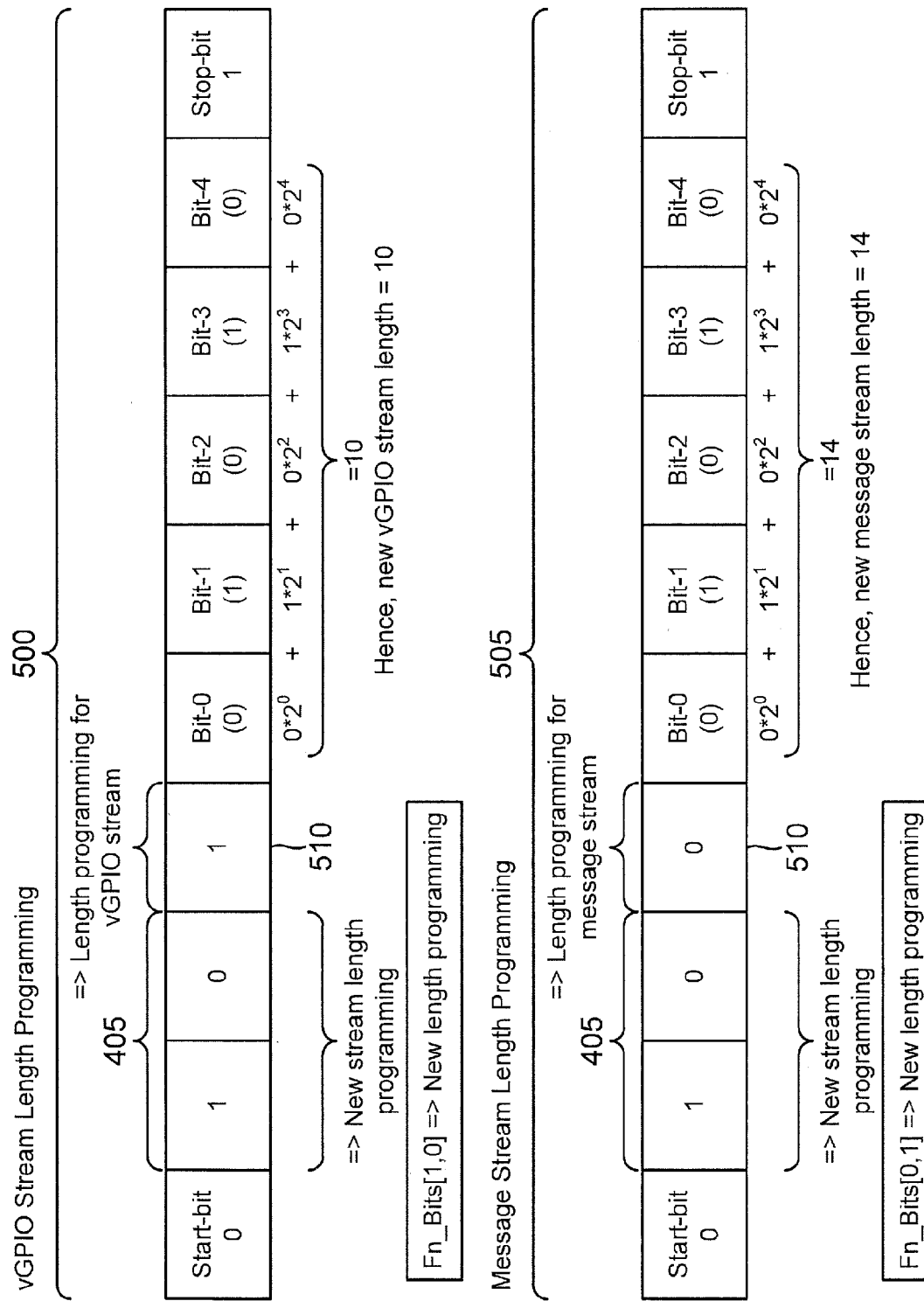
FIG. 5 illustrates a pair of programming frames used to program the virtual GPIO and messaging frame lengths in the system of FIG. 1.

Consider the advantages of dedicated frame 400: with just the overhead of two function bits, various messaging signals 138 and virtual GPIO signals 135 may be transmitted over just one dedicated transmit pin 111. When a dedicated frame 400 is used to program the dedicated frame length, the frame may also be designated a programming frame. Example programming frames to set the dedicated frame length are shown in FIG. 5. A programming frame 500 sets the length for a frame dedicated to virtual GPIO signals. Similarly, a programming frame 605 sets the frame length for a frame dedicated to messaging signals. The number of bits used to define the frame length (and thus the length of each programming frame) is predefined. Thus, once a hybrid virtual GPIO FSM 115 sees a header 405 indicating that a programming length is being set (such as fn_0 equaling 1 and fn_1 equaling 0 as discussed previously), then it will read the frame length from the following frame body. In that regard, a hybrid virtual GPIO FSM 115 needs to know whether the length of a dedicated virtual GPIO frame or a dedicated messaging frame is being programmed. Thus, each header 405 for programming frames 500 and 505 may be followed by a frame type bit 510. For example, a frame type bit 510 equaling one may signify that a dedicated virtual GPIO frame length is being programmed whereas a frame type bit 510 equaling zero may signify that a dedicated messaging signal frame length is being programmed. In one embodiment, each programming frame 500 and 505 includes five programming bits, ranging from a bit-0 to a bit-4. Each bit is the coefficient for a power of 2 as identified by its name. In other words, bit-0 is the coefficient for multiplying $2^0$, bit-1 is the coefficient for multiplying $2^1$, bit-2 is the coefficient for multiplying $2^2$, bit-3 is the coefficient for multiplying $2^3$, and bit-4 is the coefficient for multiplying $2^4$. The five programming bits can thus program a frame length from zero to 31. An additional programming bit would enable the programming of a frame length up to 63, and so on. In FIG. 5, the programming bits for programming frame 500 set the new dedicated virtual GPIO frame length to be 10 bits. Similarly, the programming bits for programming frame 505 set the new dedicated messaging frame length to be 14 bits.

Figure 6:
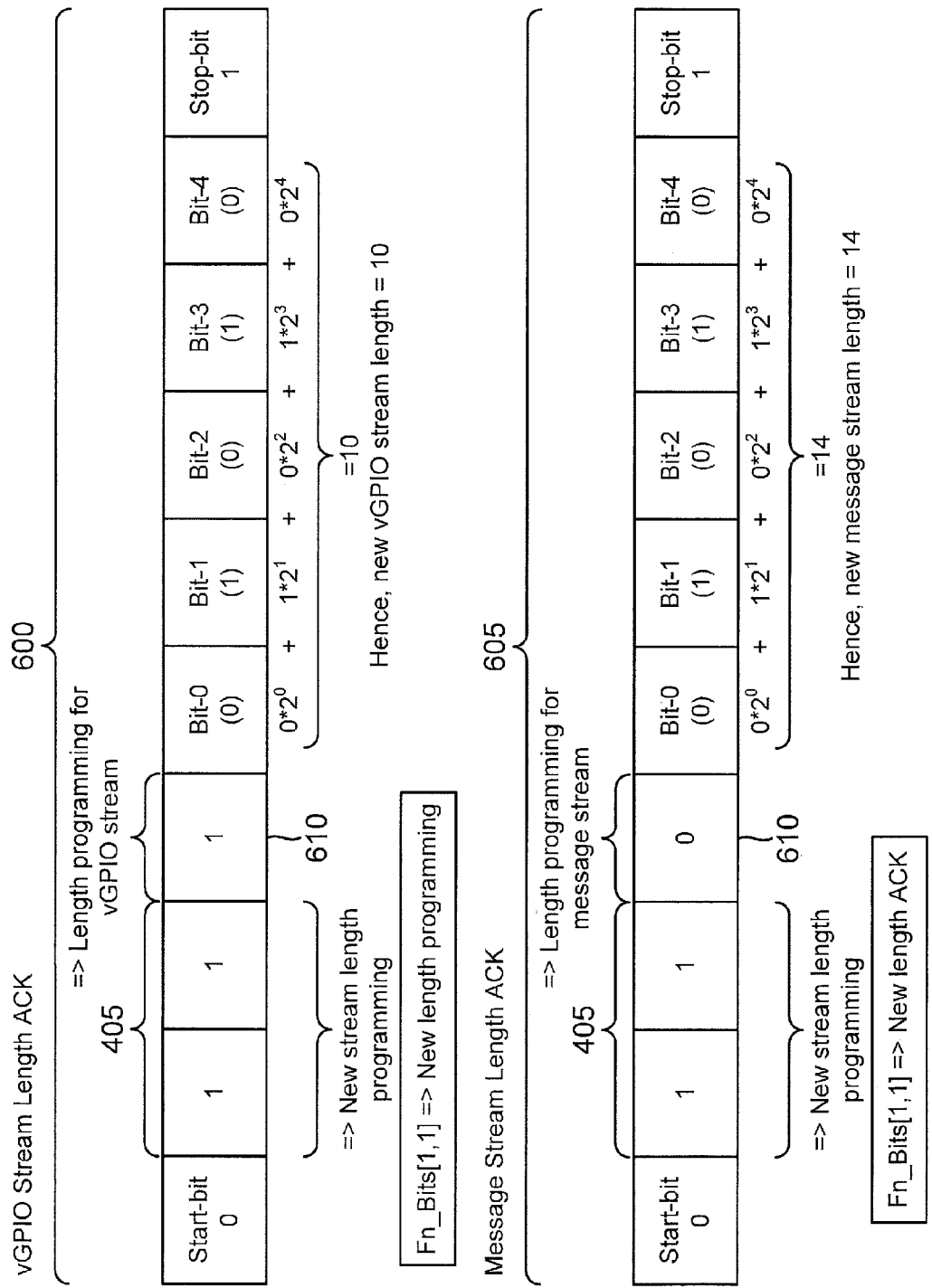
FIG. 6 illustrates a pair of acknowledgement frames used to acknowledge the frame lengths programmed in response to the frames of FIG. 5.

When a receiving hybrid virtual GPIO FSM 115 receives a programming frame such as frame 500 or 505, it may proceed to acknowledge the defined frame length using an acknowledgment frame. Example acknowledgement frames are shown in FIG. 6. An acknowledgement frame 600 is a virtual GPIO acknowledgment frame whereas a frame 605 is a messaging signal acknowledgement frame. Each acknowledgement frame 600 and 605 includes a header 405 in which the function bits identify the frame as an acknowledgment frame (such as fn_0 equaling 1 and fn_1 equaling 1 as discussed previously). A frame type bit 610 following header 405 identifies the acknowledgment frame type. For example, virtual GPIO acknowledgment frame 600 is identified by frame type bit 610 equaling a logic one. Conversely, messaging signal acknowledgment frame 605 may be identified by a frame type bit 610 equaling logic zero. The programming bits following the frame type bit 610 equal the programming bits in corresponding programming frames 500 or 505 as discussed with regard to FIG. 5.

Figure 7:
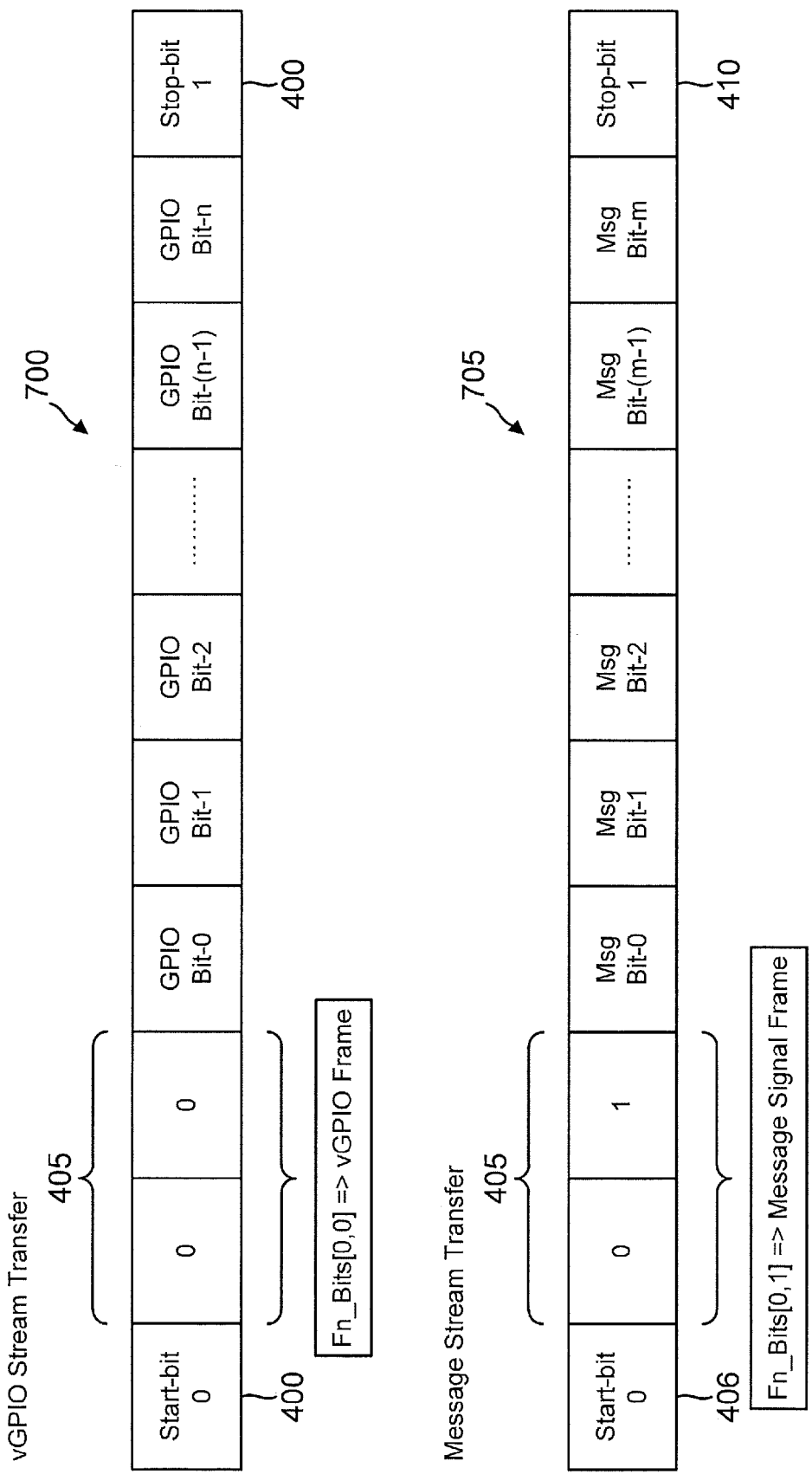
FIG. 7 illustrates an example dedicated virtual GPIO frame and an example dedicated messaging signal frame for the system of FIG. 1.

Once the frame lengths are thus programmed through programming frames and acknowledgement frames, a dedicated frame 700 of virtual GPIO signals 135 or a dedicated frame 705 of messaging signals 138 may be transmitted as shown in FIG. 7. Referring again to FIG. 1, recall that there are m virtual GPIO signals 135 and M+1 messaging signals 138. Frame 700 could thus be dedicated to just one GPIO port (one of the m virtual GPIO signals 135) or it could include one bit each from the m GPIO signals 135. In other words, one could serially transmit GPIO words according to the various ports or they could be transmitted in parallel. The same serial/parallel consideration applies to the messaging signals. Regardless of whether each dedicated frame 700 and 705 is carrying multiple ports or just one, header 405 identifies whether the dedicated frame is a virtual GPIO frame or a messaging signal frame.

Figure 8:
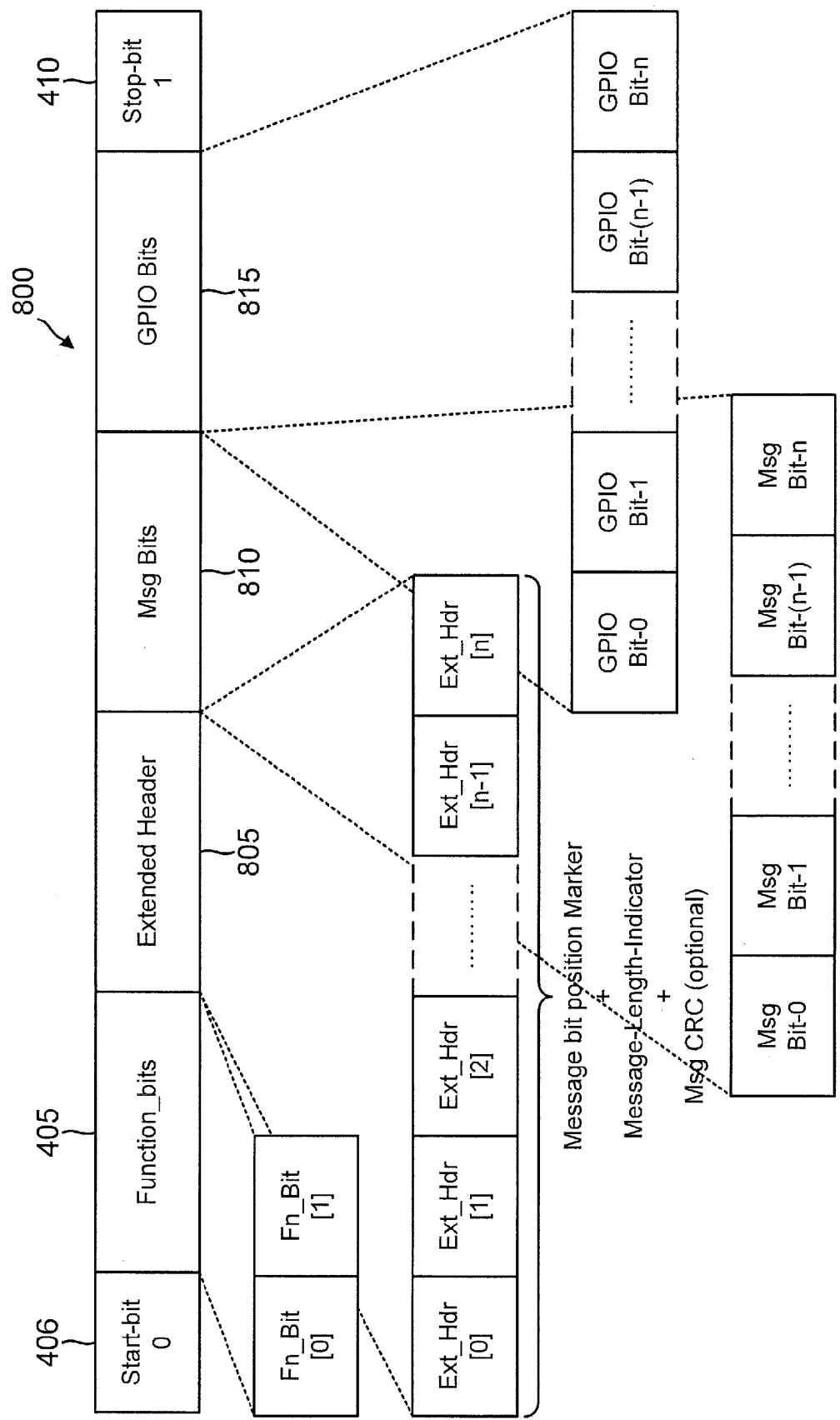
FIG. 8 illustrates a hybrid frame for the system of FIG. 1 that includes both virtual GPIO signals and messaging signals.

Rather than use separate dedicated frames to transmit the virtual GPIO signals 135 and messaging signals 138, these signals may be combined in an alternative embodiment for a hybrid virtual GPIO system in which a hybrid frame includes both virtual GPIO signals 135 and messaging signals 136. For example, FIG. 8 shows an example hybrid frame 800 that includes header 405 as well as an extended header 805. Extended header 805 indicates the bit position of the messaging signal bits and the virtual GPIO bits that follow extended header 805 and are before stop bit 410. Depending upon the latency requirements, either a set of messaging bits 810 or a set of virtual GPIO bits 815 may be first in the frame body. In some embodiments, extended header 805 may include error correction bits such as CRC bits. Note that extended header 805 need merely identify the position and length of just the virtual GPIO bits 815 or just the messaging bits 810 since the remaining bits are thus known by default to belong to the remaining bit category.

Figure 9:
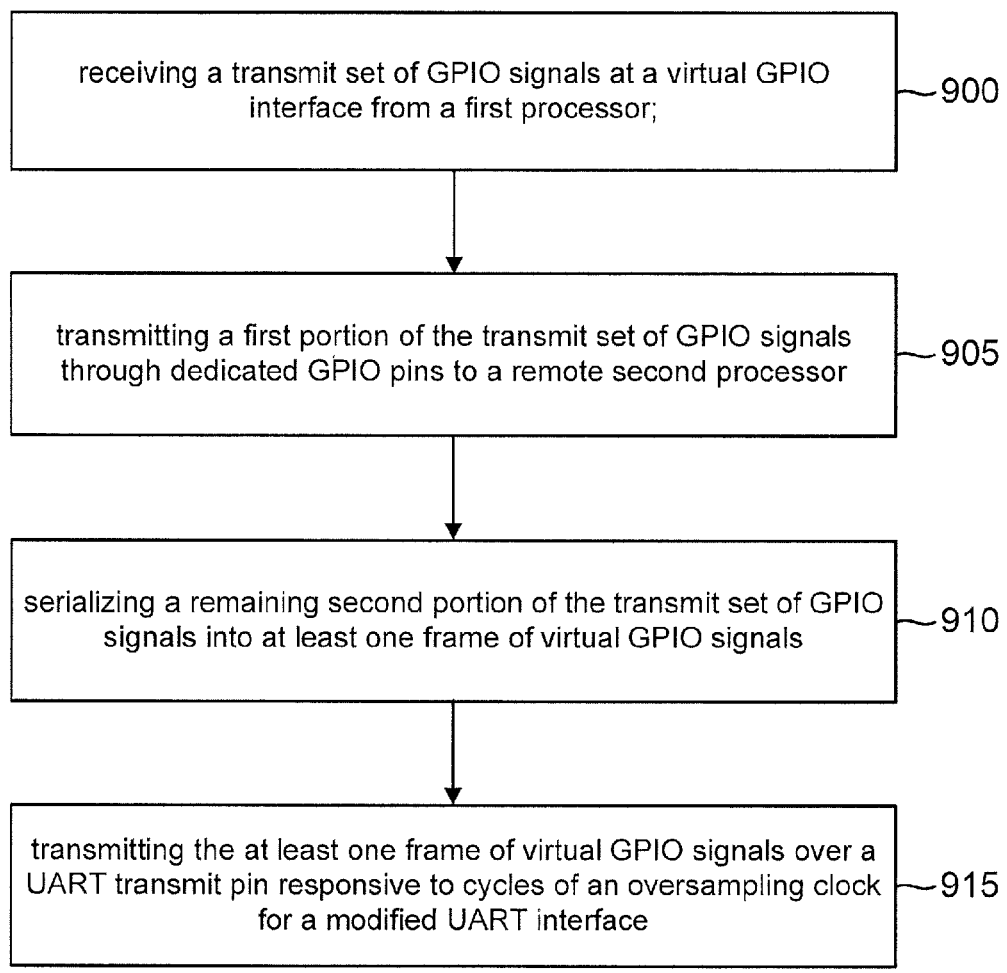
FIG. 9 is a flowchart for a method of operation for an integrated circuit in the system of FIG. 1.

A method of operation for either of integrated circuits 101 and 105 in system 100 will now be discussed with regard to the flowchart of FIG. 9. The method includes an act 900 of receiving a transmit set of GPIO signals at a virtual GPIO interface from a first processor. The receipt of the transmit set of GPIO signals at each virtual GPIO interface 103 from the corresponding processor 102 that are formed into GPIO signals 130 and virtual GPIO signals 135 is an example of act 900. The method also includes an act 905 of transmitting a first portion of the transmit set of GPIO signals through dedicated GPIO pins to a remote second processor. The transmission of GPIO signals 130 from integrated circuit 101 through GPIO pins 125 to processor 102 in integrated circuit 105 is an example of act 905. The method also includes an act 910 of serializing a remaining second portion of the transmit set of GPIO signals into frames of virtual GPIO signals. The serialization of virtual GPIO signals 135 in hybrid virtual GPIO FSM 115 is an example of act 910. Finally, the method includes an act 915 of transmitting the frames of virtual GPIO signals over a UART transmit pin to the remote second processor responsive to cycles of an oversampling clock for a modified UART interface. The transmission of a dedicated frame 400 or a hybrid frame 800 of virtual GPIO signals 135 through a modified UART interface and over a transmit pin 111 as discussed with regard to FIGS. 1, 4, and 8 is an example of act 915.

Figure 10:
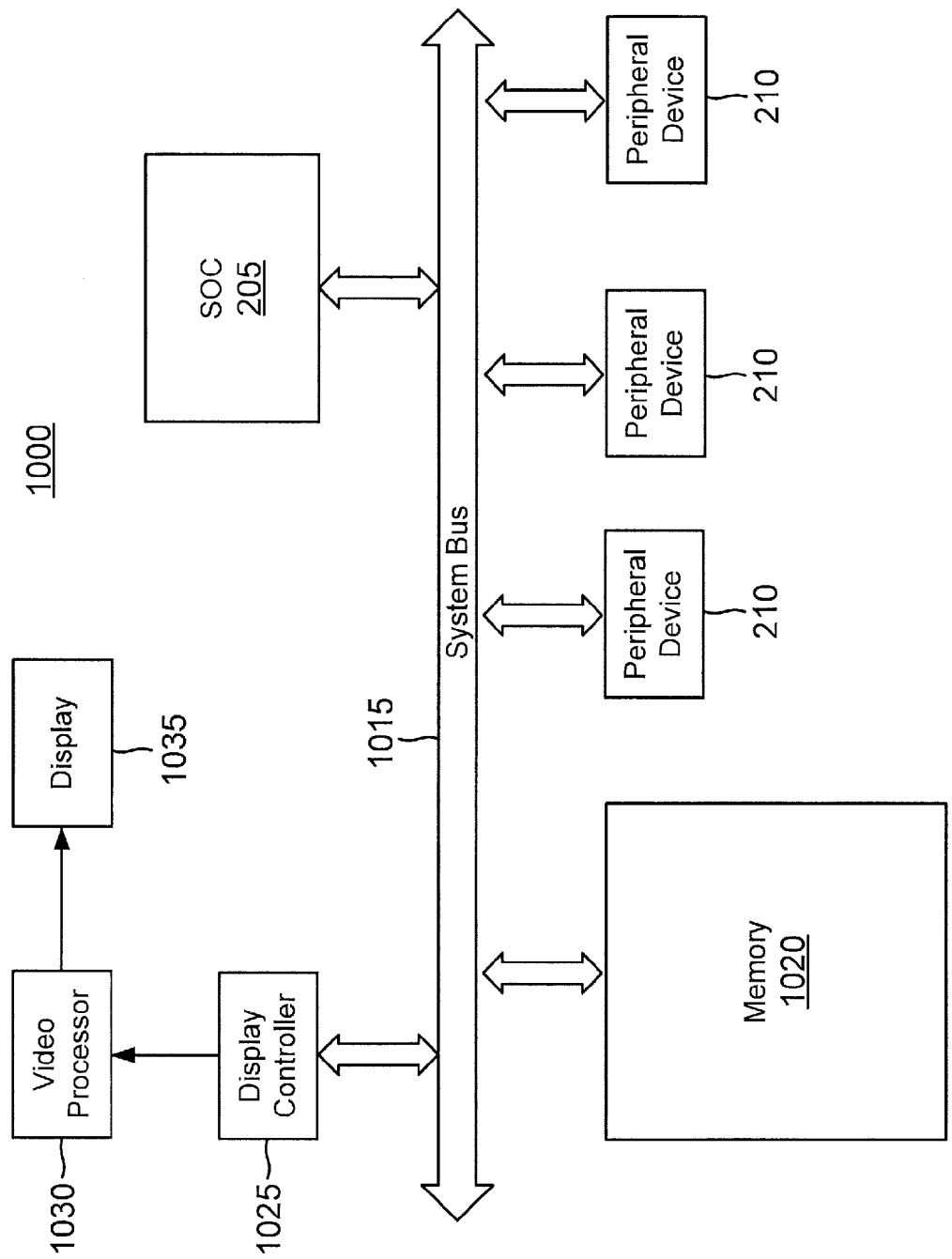
FIG. 10 is a block diagram for an example device incorporating one of the integrated circuits shown in the system of FIG. 1.

Each integrated circuit 101 and 105 in system 100 of FIG. 1 may be incorporated as a system-on-a-chip (SoC) 205 into a device 1000 as shown in FIG. 10. Device 1000 may comprise a cellular phone, smart phone, personal digital assistant, tablet computer, laptop computer, digital camera, handheld gaming device, or other suitable device. SoC 205 communicates with peripheral devices 210 such as sensors over a system bus 1015 that also couples to a memory such as a DRAM 1020 and to a display controller 1025. In turn display controller 1025 couples to a video processor 1030 that drives a display 1035.

Figure 11:
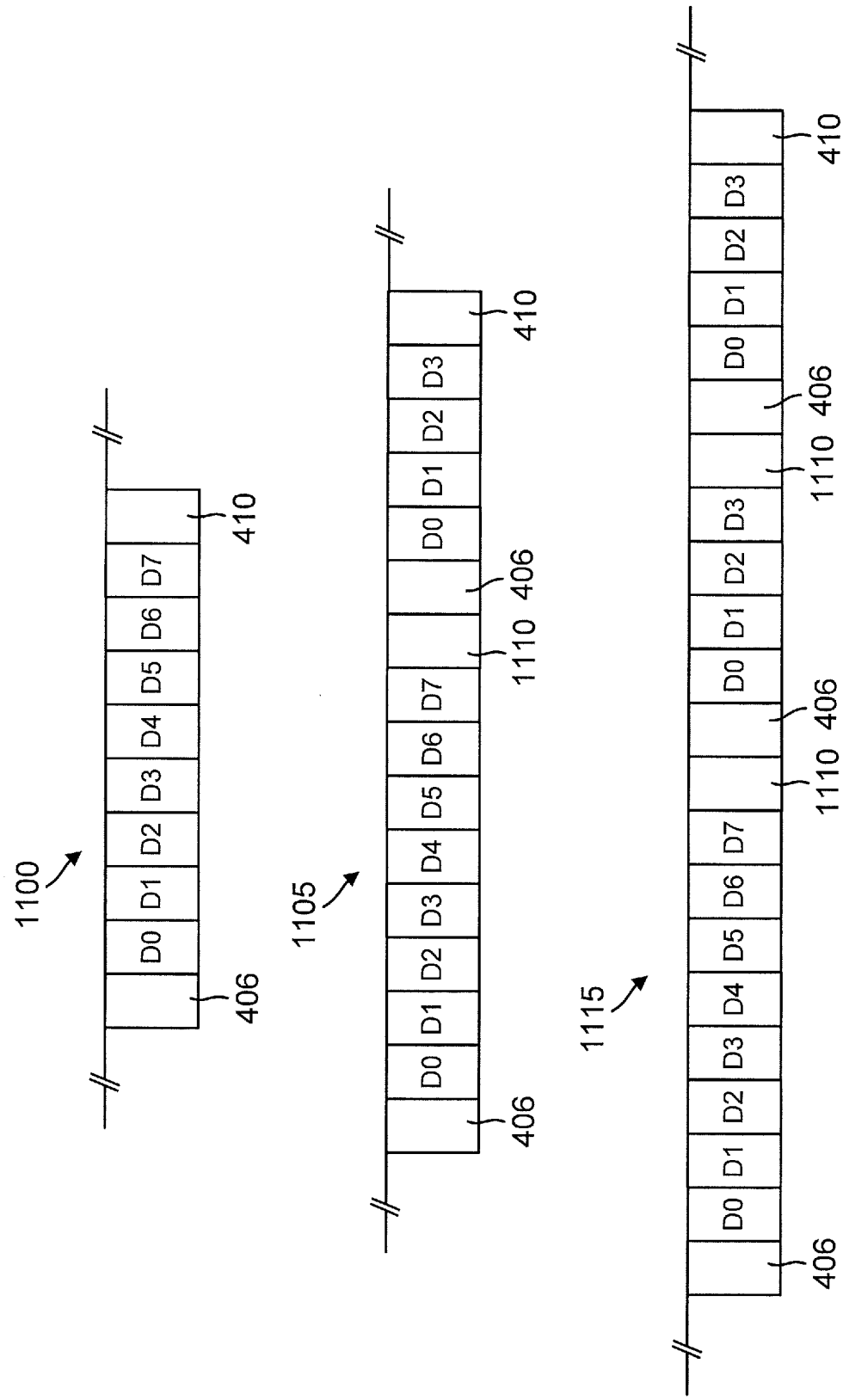
FIG. 11 illustrates a frame with no intermediate timing bits, a frame with one intermediate timing bit, and a frame with two intermediate timing bits.

It will be appreciated that the frame structure such as discussed with regard to the dedicated frames and the hybrid frames may be modified to include error correction codes such a Hamming code. In addition, the frames discussed herein may be modified to include intermediate timing bits to address the asynchronicity between the oversampling clock rate in a transmitting modified UART interface as compared to the oversampling clock rate in a receiving modified UART interface. If the frame size is relatively short, the resulting asynchronicity may be relatively harmless. For example, a frame 1100 as shown in FIG. 11 has a payload length of eight data bits (which may be virtual UART bits or messaging signals bits) between a start bit 406 and a stop bit 410. The eight data bits are arranged from an initial data bit D0 to a final data bit D7 to form the data payload for frame 1100. At a synchronized 16× oversampling clock rate, the receiving modified UART interface will sample 128 times across the data payload for frame 1100. But if the oversampling clock rate is too slow, it may instead sample just 127 times across the data payload such that the $128^{th}$ sample would be erroneously taken from stop bit 410 instead of from data bit D7. Conversely, the oversampling clock rate may be too fast in the receiving modified UART interface. In this case the resulting errors are minor in that they involve just a handful of erroneous samples.

However the erroneous samples could increase in number as the frame length is increased. To keep the oversampling clock rate in the receiving modified UART interface synchronized with the oversampling clock rate in the transmitting UART interface, an intermediate timing bit 1110 may be inserted in the data payload as shown in for a frame 1105 in FIG. 11. Both the transmitting integrated circuit and the receiving integrated circuit are configured with the position of the intermediate timing bit and its binary value prior to a frame transmission. Such configuration may be performed analogously as with regard to the programming and acknowledgement frames discussed above. The receiving modified UART interface will thus know how many samples should have been taken of the data payload before intermediate timing bit 1110 is sampled. In frame 1105, intermediate timing bit 1110 follows data bit D7 such that the receiving modified UART interface should have taken 128 samples (assuming that a 16× oversampling rate is used) prior to sampling intermediate timing bit 1110. If the receiving modified UART interface has taken more or less than the desired number of samples prior to sampling intermediate timing bit 1110, it may adjust its oversampling clock rate accordingly. An additional start bit 406 may be inserted after intermediate timing bit 1110. As the frame size increases, additional intermediate timing bits 1110 may be inserted to maintain synchronicity. For example, a frame 1115 shown in FIG. 11 includes two intermediate stop bits 1110. It will be appreciated that more than two intermediate timing bits 1110 may be inserted into a frame as the frame size increases.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An integrated circuit, comprising:
a first processor;
a plurality of GPIO pins;
a virtual GPIO interface configured to receive a transmit set of GPIO signals from the processor and to transmit a first portion of the transmit set over the GPIO pins to a remote second processor;
a finite state machine configured to serialize a second portion of the transmit set of GPIO signals from the virtual GPIO interface into at least one first frame of virtual GPIO signals, wherein the finite state machine includes a plurality of messaging registers, and wherein the first processor is configured to write a plurality of first messaging signals to the messaging registers, and wherein the finite state machine is further configured to serialize the first messaging signals from the messaging registers into at least one second frame, and wherein the modified UART interface is further configured to transmit the at least one second frame to the remote second processor over the UART transmit pin responsive to cycles of the oversampling clock, and wherein the finite state machine is further configured to attach a header to the at least one first frame to identify the at least one first frame as being dedicated to the virtual GPIO signals; and
a modified Universal Asynchronous Receiver/Transmitter (UART) interface configured to transmit the at least one first frame to the remote second processor over a UART transmit pin responsive to cycles of an oversampling clock.

2. The integrated circuit of claim 1, wherein the modified UART interface is configured to transmit the at least one first frame to the remote processor responsive to 16 cycles of the oversampling clock per bit in the at least one frame.

3. The integrated circuit of claim 1, wherein the finite state machine is further configured to attach a header to the at least one second frame to identify the at least one second frame as being dedicated to the messaging signals.

4. The integrated circuit of claim 1, wherein the finite state machine is further configured to serialize a third portion of the portion of the transmit set of GPIO signals into an at least one third frame and to serialize a set of second messaging signals from the messaging registers into the at least third frame.

5. The integrated circuit of claim 4, wherein the finite state machine is further configured to attach a header to the at least one third frame to identify the at least one first frame as being a hybrid frame containing both the virtual GPIO signals and the messaging signals.

6. The integrated circuit of claim 4, wherein the finite state machine is further configured to attach an extended header to the at least one third frame to identify a position of the virtual GPIO signals in the at least one third frame and to identify a position of the messaging signals in the at least one third frame.

7. The integrated circuit of claim 1, wherein the finite state machine is further configured to form a programming frame that identifies a length for the at least one first frame, and wherein the modified UART interface is further configured to transmit the programming frame to the remote second processor over the UART transmit pin responsive to cycles of the oversampling clock.

8. The integrated circuit of claim 7, wherein the modified UART interface is further configured to receive an acknowledgment frame that acknowledges the length for at the at least one first frame over a UART receive pin responsive to cycles of the oversampling clock.

9. The integrated circuit of claim 7, wherein the integrated circuit is included within a device selected from the group consisting of a cellular phone, a smart phone, a personal digital assistant, a tablet computer, a laptop computer, a digital camera, and a handheld gaming device.

10. The integrated circuit of claim 7, wherein the modified UART interface is further configured to receive at least one second frame of virtual GPIO signals from the remote second processor over the UART receive pin responsive to cycles of the UART oversampling clock.

11. The integrated circuit of claim 1, wherein the integrated circuit is an applications processor integrated circuit.

12. A method, comprising:
receiving a transmit set of GPIO signals at a virtual GPIO interface from a first processor;
transmitting a first portion of the transmit set of GPIO signals through dedicated GPIO pins to a remote second processor;
serializing a second portion of the transmit set of GPIO signals into at least one first frame of virtual GPIO signals;
attaching a header to the at least one first frame to identify the at least one first frame as being dedicated to the virtual GPIO signals
transmitting the at least one first frame of virtual GPIO signals over a UART transmit pin to the remote second processor responsive to cycles of an oversampling clock for a modified UART interface;
writing a plurality of first messaging signals from the first processor into a plurality of messaging registers;
serializing the first messaging signals from the plurality of messaging registers into at least one second frame;
transmitting the at least one second frame over the UART transmit pin to the remote second processor responsive to cycles of the oversampling clock.

13. The method of claim 12, further comprising attaching a header to the at least one second frame to identify the at least one second frame as being dedicated to the messaging signals.

14. The method of claim 12, further comprising:
serializing a plurality of second messaging signals from the plurality of messaging registers into the at least one third frame.

15. The method of claim 14, further comprising attaching a header to the at least one third frame to identify the at least one third frame as a hybrid frame including both the virtual GPIO signals and the messaging signals.

* * * * *